United States Patent
Augustine

(10) Patent No.: US 6,447,896 B1
(45) Date of Patent: Sep. 10, 2002

(54) COATED REINFORCED CERAMIC CUTTING TOOLS

(75) Inventor: Eugene M. Augustine, Saegertown, PA (US)

(73) Assignee: Greenleaf Technology Corporation, Wilmington, DE (US)

( * ) Notice: Subject to any disclaimer, the term of this patent is extended or adjusted under 35 U.S.C. 154(b) by 0 days.

(21) Appl. No.: 06/859,933

(22) Filed: May 5, 1986

(51) Int. Cl.⁷ ................................................ G32B 9/00
(52) U.S. Cl. ...................... 428/336; 407/119; 51/307; 51/309; 428/334; 428/428; 428/446; 428/697; 428/658; 428/699; 428/701
(58) Field of Search ............................ 428/698, 9, 699, 428/334, 336, 426, 428, 446, 697, 701; 51/295, 307, 309; 407/119

(56) References Cited

U.S. PATENT DOCUMENTS

| | | |
|---|---|---|
| 2,962,388 A | 11/1960 | Ruppert et al. |
| 3,914,473 A | 10/1975 | Hale |
| 4,035,541 A | 7/1977 | Smith et al. |
| 4,162,388 A | 7/1979 | Schintlmeister |
| 4,336,305 A | 6/1982 | Tanaka |
| 4,421,525 A | 12/1983 | Sarin et al. |
| 4,441,894 A | 4/1984 | Sarin et al. |
| 4,485,179 A | * 11/1984 | Brennan et al. ........ 428/698 X |
| 4,530,875 A | * 7/1985 | Donomoto et al. ..... 428/698 X |
| 4,532,182 A | * 7/1985 | Short et al. .............. 428/698 X |
| 4,554,197 A | * 11/1985 | Chyung et al. ......... 428/701 X |
| 4,569,886 A | * 2/1986 | Divecha et al. ......... 428/698 X |
| 4,589,900 A | * 5/1986 | Brennan et al. ........ 428/698 X |
| 4,626,461 A | * 12/1986 | Prewo et al. ........... 428/698 X |
| 4,642,271 A | * 2/1987 | Rice ........................... 428/698 |
| 4,714,660 A | * 12/1987 | Gates, Jr. .................... 428/698 |
| 4,772,524 A | * 9/1988 | Coblenz ................. 428/689 X |

FOREIGN PATENT DOCUMENTS

| | | | |
|---|---|---|---|
| EP | 0106817 | * 4/1984 | |
| EP | 0252046 | * 1/1988 | ................ 428/698 |
| GB | 2157282 | * 10/1985 | |

* cited by examiner

*Primary Examiner*—Archene Turner
(74) *Attorney, Agent, or Firm*—Kirkpatrick & Lockhart LLP

(57) ABSTRACT

Improved formulations for ceramic materials for use as cutting tools are provided. The cutting tool includes a substrate of a ceramic matrix reinforced by ceramic whiskers, which substrate is coated with an adherent outer layer. The ceramic matrix is preferably formed from alumina and may contain toughening agents. The ceramic whiskers are preferably formed from silicon carbide and consist of 2–40% of the substrate. The cuter adherent coating is preferably alumina applied by a CVD process and provides an unexpected improvement in cutting tool longevity.

60 Claims, 1 Drawing Sheet

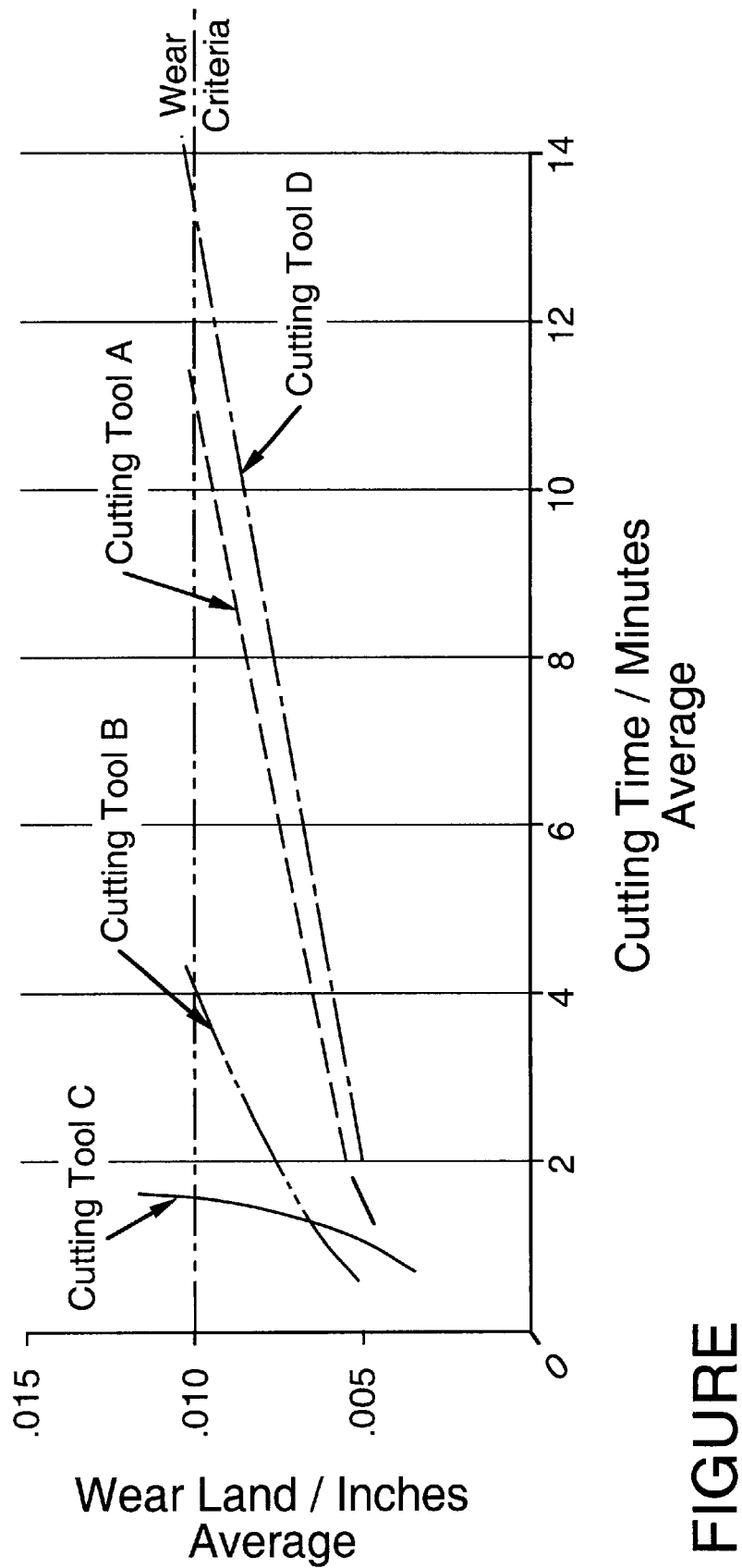
FIGURE

COATED REINFORCED CERAMIC CUTTING TOOLS

BACKGROUND OF THE INVENTION

1. Field of the Invention

The present invention relates to cutting tools and, in particular, to coated reinforced ceramic cutting tools.

2. Description of the Prior Art

In a myriad of applications throughout modern industry, it is necessary to form objects which resist deformation into a final desired shape. One common means of shaping such objects, known as workpieces, is machining. Various known machining processes include turning, shaping, planing, milling, facing, grinding, sawing, boring and drilling. In order for the workpiece to be shaped by a machining process, relative movement must occur between the workpiece and the instrument, known as a cutting tool, employed to shape it in order that a desired amount of material may be removed from the workpiece.

To meet the productivity demands currently imposed on the machining industry, the rate of removal of material from the workpiece is of critical concern. The commonly measured parameters of cutting tool performance include predictability of tool performance failure, cutting speed, depth of cut, feed rate and tool life. To meet this end, those skilled in the art have previously developed materials for use as cutting tools which are intended to allow greater rates of productivity in machining operations. Such previous materials may be broadly classified as either "metals" or "ceramics" based on the constituents of the materials. The term "metals" generally includes tool steels, high speed steels, cast nonferrous alloys and sintered carbides.

Those skilled in the art recognize that cutting tools made from such metals possess the desirable characteristic of a high degree of toughness. Toughness is known as the ability of a material to resist crack propagation and, hence, to be less susceptible to breakage. However, a notorious flaw of metal cutting tools is their characteristic of rapid wear under service conditions. The wearing of metal cutting tools arises both from the mechanical wearing away of the cutting tool due to the cutting activity and from the chemical breakdown of the tool at the high temperatures created by the frictional forces generated during high speed cutting. The chemical reactivity of metal cutting tools can also chemically degrade the workpiece causing a rough surface finish which must be subjected to costly secondary finishing procedures. To lessen the effects of the problems associated with metallic cutting tools, the common practice in the industry has been to drastically lower the cutting speeds at which metal cutting tools are employed. The lowering of the cutting speeds necessarily causes the lessening of the productivity rate of the machine using the cutting tool and forces the machining entity to employ additional machines and personnel to achieve a desired level of productivity.

The other category of cutting tools referenced above is that composed of ceramic materials. Ceramic cutting tool materials include aluminum oxide, or alumina, and nitrides such as silicon nitride. Due to their chemical composition, ceramic cutting tools are much more resistant to heat than their metallic counterparts. As such, the cutting speeds at which ceramic cutting tools may be used are increased. Also, ceramics are generally nonreactive with the metal workpiece at elevated temperatures thereby reducing concerns relative to the chemical degradation of the workpiece which also increases the cutting speeds at which ceramic cutting tools may be used.

Ceramic cutting tools, however, are fraught with a serious shortcoming of their own. It is known that ceramic cutting tools do not possess strengths similar to metals and fail catastrophically and unpredictably. Such catastrophic, unpredictable failures have led those in the industry to only employ a particular ceramic cutting tool for a most limited number of workpieces. In fact, in many instances ceramic cutting tools are only used once and then removed from the cutting machine and discarded. It will be readily appreciated that the constant halting of the manufacturing process to allow each ceramic cutting tool to be removed from the machine and replaced with another is very costly in terms of machine downtime and cutting tool expenses and, additionally, is extremely labor intensive. Many manufacturing installations have been forced to purchase, operate and maintain a multiple number of machines to accommodate the excessive amount of downtime experienced by a single machine using ceramic cutting tools which must be constantly replaced. Moreover, due to the unpredictable failures of ceramic cutting tools, they are not suitable for use on automatic machines which are useful in efficiently producing a large number of workpieces.

In an effort to develop materials for use in cutting tools which avoid the problems associated with metallic and ceramic tools, various solutions have been proposed by the prior art. One such solution which has been employed with respect to metallic cutting tools has been to coat such tools with a layer of a harder, more wear-resistant material such as titanium carbide. Cutting tools so coated have been shown to provide an improved tool life as the coating provides a barrier against the mechanical, thermal and chemical effects of cutting on a metallic cutting tool alone. However, due to the basic properties of metallic cutting tools, even metallic cutting tools so coated have proven to have tool lives less than those of ceramic cutting tools under high speed cutting conditions.

It has additionally been proposed to coat ceramic cutting tools such as those formed of silicon nitride with a material such as alumina. The coating of a ceramic cutting tool provides a more wear-resistant cutting tool as the coating acts as a thermal barrier to resist any grain boundary degradation which may occur in ceramic cutting tools at elevated temperatures. In addition, certain ceramic cutting tools have been found to be chemically reactive when cutting materials such as steels at high speeds. The coating of alumina, therefore, decreases the chemical effects on the ceramic cutting tool. It should be recognized that the coating of a ceramic cutting tool with a coating layer has proven to have little or no effect on the ability of the tool to resist catastrophic failure. As such, and due to the increased tool cost due to the coating process, coated ceramic cutting tools have not, heretofore, achieved a significant degree of commercial success.

In another attempt to eliminate problems with prior cutting tool materials, there has recently been developed a material which minimizes the potential for catastrophic failure in a ceramic cutting tool. The specifics of such material are disclosed in U.S. Pat. No. 4,543,345. That material consists of a ceramic matrix having distributed therethrough a reinforcing material comprising ceramic whiskers. In a preferred embodiment of that material, the ceramic matrix comprises alumina. The most preferred of the reinforcing ceramic whiskers are those of silicon carbide and are included in the cutting tool in an amount equal to or less than 50% by volume of the material.

It has been found that a cutting tool material as described immediately above provides an increased tool life over a purely ceramic cutting tool as the toughness and, hence, resistance to breakage is increased. As such, the resistance to catastrophic unpredictable failure is increased. However, it has also been discovered that the cutting tool so produced contains a previously unseen shortcoming in ceramic cutting tools. Due to the inclusion of the silicon carbide whiskers throughout the ceramic matrix, a certain amount of the ceramic whiskers are necessarily disposed adjacent to the surface of the cutting tool. As the cutting speed and, hence, the heat due to friction, is increased, although not to the level harmful to previous ceramic cutting tools, a chemical reaction has been found to occur between the surface silicon carbide whiskers and the metal workpiece. The problems caused by such a chemical reaction parallel those faced by purely metallic cutting tools such as decreased tool life and chemical damage to the workpiece. Those problems are found to occur at a higher temperature than that of a metallic cutting tool but at a lower temperature than a ceramic cutting tool. In addition, when the silicon carbide in the whiskers is exposed to the metal cutting interface temperatures, it will oxidize to silica and thereby provide a path for oxygen to enter the substrate and weaken the structure.

While previous attempts to cure certain of the shortcomings of prior art cutting tools have included the deposition of a coating layer thereon, such a procedure is contraindicated relative to ceramic cutting tools such as those which are alumina based. Applicant has discovered that the deposition of a coating layer of alumina on a ceramic cutting tool formed of alumina produces a decreased tool life as compared to an uncoated cutting tool of the same substrate material. In fact, the decrease in tool life of the coated alumina composition is so marked as to clearly indicate that such a coating is extremely detrimental to the tool life of an alumina cutting tool.

The subject invention is directed toward an improved reinforced ceramic cutting tool which overcomes, among others, the above-discussed problems and which provides a cutting tool capable of use at high speeds without experiencing catastrophic failure or excessive tool wear.

SUMMARY OF THE INVENTION

In accordance with the present invention, there is provided an improved material for use in applications such as for a cutting tool in machining operations. The material provided herein is formed from a substrate of a ceramic matrix having distributed therethrough a reinforcement comprising ceramic whiskers, which substrate is coated with a layer of a substance such as alumina.

According to a preferred embodiment of the invention, the ceramic matrix is formed of alumina, either pure or with inclusions of modifying materials. Alternatively, the matrix may be formed of silicon carbide, silicon nitride, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS (a known combination of silicon oxide, oxygen, nitrogen and alumina). The preferred material for the ceramic reinforcing whiskers is silicon carbide. Other materials suitable for the ceramic whiskers include silicon nitride, alumina, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS or any other material which is compatible with the ceramic matrix and with which it forms adequate reinforcement bonding.

The level of whisker content in the ceramic matrix should not be so great as to degrade the properties of the matrix. However, if the whisker content is too low, sufficient reinforcement will not be provided. As such, the generally acceptable range of whisker content will be about 2–40% volume percent whiskers in the composite materials.

The coating material applied to the substrate is preferably selected from the group consisting of silicon carbide, silicon nitride, alumina, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS or a combination thereof, but most preferably is alumina and is applied by means of a chemical vapor phase deposition (CVD) process or by physical vapor deposition (PVD), Sol-gel or ion implantation processes or a combination thereof. The alumina coating is preferably applied to a thickness of approximately 5 microns.

Applicant has discovered that the application of an alumina coating to the reinforced ceramic cutting tool markedly increases the tool life while providing a tool which resists unexpected catastrophic failure. As discovered previously, the application of an alumina coating to an alumina-based cutting tool is known to degrade the tool life. As such, Applicant's invention provides unexpected results which not only show an improvement in alumina-based cutting tool life because of the addition of an alumina coating thereto but which, in fact, are taught away from by the prior art.

Accordingly, the present invention provides solutions to the aforementioned problems present in the machining industry. As this invention provides an improved cutting tool which has the benefits of ceramic cutting tools without the shortcomings thereof, machining processes may be carried on rapidly, efficiently and without the requirement of a great number of machines to accommodate a significant productivity rate.

These and other details, objects and advantages of this invention will become apparent as the following description of the present preferred embodiment thereof proceeds.

BRIEF DESCRIPTION OF THE DRAWING

In the accompanying drawing, I have shown the results of the performance tests of the present preferred embodiment of the invention wherein:

The FIGURE is a chart indicating the tool life of materials produced in accordance with the present invention as compared to other cutting tool materials.

DETAILED DESCRIPTION OF THE PREFERRED EMBODIMENTS

As disclosed above, the present invention relates to an improved material for use in cutting tools and cutting tool inserts which includes a ceramic substrate matrix reinforced with whiskers, which substrate is coated with an adherent coating. The ceramic materials which may form the matrix body of the cutting tool are any of the ceramic materials which have previously been found useful as cutting tools in the unreinforced condition such as silicon carbide, silicon nitride, alumina, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS or a combination of these. An example of a combination of the above would be alumina with less than 1% to over 40%. zirconium oxide. The preferred of such matrix materials is alumina. The matrix materials may be employed alone or it may be combined with minor amounts (i.e. less than about 30%) of toughening materials such as zirconia, yttria, hafnia, magnesia, ceria, silicon nitride and titanim carbide or mixtures thereof.

The reinforcing whiskers may comprise any known reinforcing substance and are preferably silicon carbide whiskers of either the alpha or beta forms. However, the reinforcing whiskers may also be formed from silicon nitride, alumina, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS or a combination thereof. Of course, any selected whisker material must be compatible with the ceramic matrix composition so as to be bound therein to produce a reinforcement of the matrix. The bonding of the whiskers in the matrix is found to be satisfactory to produce the desired reinforcement when the ceramic whisker content is about 2–60% volume percent of the whisker/matrix composite with about 2–40% preferred and about 20% most preferred. The preferred ranges of whisker content will depend on the type of cutting service for which the tool is designed. When the tool is to be used for those types of cutting (e.g. turning) where the cutting force is applied continuously and a high degree of heat builds up in the cutting tool, a lower whisker content (about 2–12%) is preferred. A higher ceramic whisker content (about 20–35%) is preferred where the cutting force is applied in a more interrupted or intermittent manner.

For purposes of explanation, the present invention will be discussed in terms of a substrate having alumina as the ceramic matrix material and silicon carbide as the ceramic whisker material. With respect to silicon carbide whiskers, a known source thereof is the Advanced Materials group thereof of ARCO Chemical Company. The silicon carbide whiskers employed have average diameters of about 0.6 microns and aspect ratios of about 15–150. It is known that such silicon carbide whiskers have strengths on the order of 1 million psi, tensile moduli on the order of 60–100 million psi and are thermally stable to 1760° C.

The substrate ceramic matrix/ceramic whisker composite employed in the present invention is formed by first blending the proper proportions of the ceramic matrix material in a powdered form with the ceramic whiskers. It should be recognized, however, that the blending must be such as to thoroughly disperse the whiskers throughout the particulate ceramic matrix material without significantly degrading the whiskers themselves.

Following the blending of the ceramic matrix material/ceramic whisker mixture, the substrate is formed using procedures normally employed in the formation of unreinforced ceramic cutting tools. Typically, the cutting tools are formed by molding the blended materials under pressures of 3,000–60,000 psi and either simultaneously or subsequently sintering at temperatures on the order of 800–1,750° C. for about 0.75 to 2.5 hours depending on the matrix material.

After the substrate of the cutting tool is formed to the desired shape, at least one hard adherent coating layer is applied thereto. Preferred materials for the coating layer(s) are those known in the art as suitable for coating a ceramic product. Such coatings are preferably one or a combination selected from the group consisting of silicon carbide, silicon nitride, alumina, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS. Such coatings are preferably formed on the surface of the substrate reinforced composite matrix by one of the processes known in the art. Suitable coating formation processes include one or a combination of the following: a chemical vapor phase deposition process (CVD process); a physical vapor deposition (PVD) process; an ion implantation process; or a liquid chemical precipitation process such as that known as Sol-gel in which one or more coating layers of materials selected from the last-mentioned group may be applied.

In the case of forming an adherent coating layer of alumina on the substrate, the substrate is placed in a reactor. The substrate is first heated to a temperature of approximately 1,000–2,000° C. and preferably to a temperature of about 1,000–1,100° C. and most preferably to a temperature of about 1,050° C. A gaseous mixture is then flowed over the surface of the substrate to form the alumina coating. A preferred gaseous mixture is 12% $AlCl_3$, 75% $H_2$, 12% $CO_2$ and 1% HCl by volume. Such a mixture is preferably flowed at a pressure of about 50 Torr at a flow rate of about 120 $ft^3$/hr. for about 4 hours. It has been found that such a CVD process produces a desirable thickness of a coating layer of alumina of about 1–10 microns and, preferably, of 2–5 microns and most preferably of about 5 microns. If multiple coating layers are used, they may each be of a thickness of about 2 to 5 microns.

In order to illustrate the unexpected results obtained by the present invention, reference will be made to comparison cutting tests performed on a cutting tool formed according to the present invention with other ceramic cutting tools. A cutting tool designated as cutting tool A was formed by a cold pressing and sinter process using alumina powder of a particle size about 0.5 to 5 microns. In the formation of cutting tool A, the alumina, along with less than 1% by weight of one of a sintering aid and grain growth inhibitor selected from the group consisting of magnesium oxide, calcium oxide and yttrium oxide, was pressed in a die as is known in the art to the desired final shape. Cutting tool A was then placed in a kiln to sinter the particles together. The kiln temperature applied was about 1,400–1,600° C. for a period of 2–4 hours to complete the formation of cutting tool A.

The substrate of a cutting tool designated as B was produced by processing alumina according to the procedures set forth above relative to cutting tool A. The substrate of cutting tool B was then subjected to a CVD process as set forth above with respect to the reinforced ceramic alumina/silicon carbide matrix cutting tool of the present invention. That CVD process, therefore, produced cutting tool B which had a substrate identical to cutting tool A but which had an adherent coating of alumina of a thickness of about 5 microns adhered thereto.

A cutting tool C was formed from an alumina matrix having reinforcing silicon carbide whiskers dispersed therein. The procedures used in the production of cutting tool C were identical to the procedures set forth above relative to the coated alumina/silicon whisker substrate, without the additional step of the CVD process deposition of an alumina coating layer.

Finally, a cutting tool D was formed in accordance with the procedures outlined herein relative to the production of a cutting tool comprising an alumina/silicon carbide matrix having an adherent coating of alumina of a thickness of 5 microns applied thereto. As such, cutting tool D represents an embodiment of the present invention.

The tool life or wear testing undertaken to compare the performances of the cutting tools A, B, C and D consisted of turning a workpiece formed from grade 4150 steel and a Rockwell C hardness rating of 28–32 at a rate of 2500 sfm and cutting the same using the respective cutting tools. The turning testing for each of the cutting tools A, B, C and D was performed at a rate of 0.010 inches per revolution, a depth of cut of 0.075 inches and a lead angle of 15°.

The average results obtained from the testing are numerically displayed in Table I and are illustrated in the FIGURE.

TABLE I

| Cutting tool | Material | Average Cutting time until .010" Tool Wear Criteria is Reached |
| --- | --- | --- |
| A | $Al_2O_3$ | 11:00 minutes |
| B | $Al_2O_3/Al_2O_3$ coating | 4:00 minutes |
| C | $Al_2O_3$/SiC whiskers | 1:45 minutes |
| D | $Al_2O_3$/SiC whiskers, $Al_2O_3$ coating | 13:09 minutes |

As is clear from Table I, the usable tool life of cutting tool A, the uncoated alumina tool, was reasonably acceptable. However, when the material of which cutting tool A was formed was coated with a layer of alumina to form cutting tool B, the wear life decreased dramatically. The tool life of cutting tool C, the alumina/silicon carbide whisker composite, however, was not reasonably acceptable. The most notable attribute of the present invention in the form of cutting tool D, having an alumina/silicon carbide whisker matrix coated with alumina, is that cutting tool D produced markedly increased tool life over a similar uncoated material. Such an increase in tool life relative to the coated reinforced ceramic matrix is unexpected due to the dramatic decrease in tool life between an alumina cutting tool (cutting tool A) and an alumina cutting tool which was coated with alumina (cutting tool B). The increase is additionally unexpected when considering the magnitude of the increase in tool life between the alumina/silicon carbide whiskers reinforced cutting tool (cutting tool C) and the alumina/silicon carbide whisker reinforced cutting tool coated with alumina (cutting tool D). As such, not only is there a drastic improvement in reinforced ceramic cutting tools provided by the present invention, but also any improvement is contraindicated by the teachings of the prior art.

Therefore, the coating of the reinforced tool provides a tool having improved wear as well as mechanical failure resistance properties. It is also noted that the coating of the reinforced ceramic material prevents the diffusion of ions from the cutting tool into the chips and/or the workpiece. Such diffusion prevention prolongs the tool life and reduces contamination of the workpiece.

While the specific embodiments discussed herein relate to coated reinforced ceramic cutting tools, it will be appreciated that the materials disclosed herein are suitable for use in alternative products. Despite the fact that the tests performed by Applicants have related to cutting tools, experience indicates that the materials disclosed herein may be employed in all other applications for ceramics known to those skilled in the art. The materials provided may be used in any environment in which the characteristics of wear and corrosion resistance, high service load capability, strength, hardness, toughness and generally improved mechanical and chemical properties as well as heat resistance are important.

It will be understood that various changes in the materials, compositions and procedures which have been herein described and illustrated in order to explain the nature of the invention may be made by those skilled in the art within the principle and scope of the invention as expressed in the appended claims.

What is claimed is:
1. A coated ceramic product comprising:
 a. a ceramic substrate body comprising a ceramic matrix having distributed therethrough reinforcing whiskers; and
 b. at least on e thin adherent chemical and friction resistant coating layer applied to said substrate body.

2. A coated ceramic product according to claim 1 in which said thin adherent coating layer is one or a combination selected from the group consisting of silicon carbide, silicon nitride, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS.

3. A coated ceramic product according to claim 1 in which said whiskers are one or a mixture selected from the group consisting of silicon nitride, alumina, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS.

4. A coated ceramic product according to claim 1 in which said matrix is formed of one or a combination selected from the group consisting of silicon carbide, silicon nitride, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS.

5. A coated ceramic product according to claim 1 in which said thin adherent coating layer is applied by one or a combination of chemical vapor phase deposition, physical vapor deposition, Sol-gel or ion implantation processes.

6. A coated ceramic product according to claim 1 in which said thin coating thickness is approximately 1 to 10 microns.

7. A coated ceramic product according to claim 1 in which said thin coating thickness is approximately 2 to 5 microns.

8. A coated ceramic product according to claim 1 further comprising a second adherent coating layer bonded to said thin adherent coating layer.

9. A coated ceramic product according to claim 8 in which said second adherent coating layer is one or a combination selected from the group consisting of silicon carbide, silicon nitride, alumina, titanium diboride, titanium carbide, titanium carbonitride, zirconium oxide, zirconium carbide, boron carbide, boron nitride, hafnium carbide, hafniun nitride, tantalum carbide, niobium carbide, tungsten carbide, aluminum oxinitride and SIALONS.

10. A coated ceramic product according to claim 8 in which said second coating layer is applied by chemical vapor phase deposition, physical vapor deposition, a Sol-gel or ion implantation processes.

11. A coated ceramic product according to claim 8 in which said thin and said second coating layer thicknesses are each approximately 2 to 5 microns.

12. In a ceramic product comprising a ceramic substrate body comprising a composite ceramic matrix having distributed therethrough reinforcing whiskers, the improvement comprising at least one adherent chemical and friction resistant coating layer applied to said ceramic substrate.

13. In a ceramic product comprising a ceramic substrate body comprising a composite ceramic matrix consisting of one or a combination of materials selected from the group consisting of silicon carbide, silicon nitride, titanium diboride, titanium carbide, titanium carbonitride, titanium nitride, zirconium oxide, zirconium carbide, boron carbide, .boron nitride, hafnium carbide, hafnium nitride, tantalum carbide, niobium carbide, tungsten carbide, aluminum oxinitride and SIALONS and having distributed therethrough reinforcement comprising ceramic whiskers of one or a mixture selected from the group consisting of silicon nitride, alumina, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS, the improvement comprising at least one thin adherent chemical and friction resistant coating layer applied to said substrate, said thin adherent coating layer selected from the group consisting of silicon carbide, silicon nitride, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS.

14. The improvement of claim 13 in which said thin adherent coating layer is applied by one or a combination of chemical vapor phase deposition, physical vapor deposition, Sol-gel or ion implantation processes.

15. The improvement of claim 13 in which the thickness of said thin adherent coating is 1 to 10 microns.

16. The improvement of claim 13 in which the thickness of said adherent coating is 2 to 5 microns.

17. The improvement of claim 13 further comprising an outer adherent coating layer bonded to said thin coating layer.

18. The improvement of claim 17 in which said outer adherent coating layer is selected from the group consisting of silicon carbide, silicon nitride, alumina, titanium diboride, titanium carbide, titanium carbonitride, zirconium oxide, zirconium carbide, boron carbide, boron nitride, hafnium carbide, hafnium nitride, tantalum carbide, niobium carbide, tungsten carbide, aluminum oxinitride and SIALONS.

19. The improvement of claim 17 in which the thicknesses of each of said thin adherent coating and said outer adherent coating are 2 to 5 microns.

20. A coated ceramic cutting tool comprising:
   a. a ceramic substrate body comprising a ceramic matrix having distributed therethrough reinforcing whiskers; and
   b. at least one thin adherent chemical and friction resistant coating layer applied to said substrate body.

21. A coated ceramic cutting tool according to claim 20 in which said thin adherent coating layer is one or a combination selected from the group consisting of silicon carbide, silicon nitride, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS.

22. A coated ceramic cutting tool according to claim 20 in which said whiskers are one or a mixture selected from the group consisting of silicon nitride, alumina, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS.

23. A coated ceramic cutting tool according to claim 20 in which said matrix is formed of one or a combination selected from the group consisting of silicon carbide, silicon nitride, titanium diboride, titanium carbide, titanium carbonitride, titanium nitride, zirconium oxide, zirconium carbide, boron carbide, boron nitride, hafnium carbide, hafnium nitride, tantalum carbide, niobium carbide, tungsten carbide, aluminum oxinitride and SIALONS.

24. A coated ceramic cutting tool according to claim 20 in which said thin adherent coating layer is applied by one or a combination of chemical vapor phase deposition, physical vapor deposition, a Sol-gel or ion implantation processes.

25. A coated ceramic cutting tool according to claim 20 in which said thin coating thickness is approximately 1 to 10 microns.

26. A coated ceramic cutting tool according to claim 20 in which said thin coating thickness is approximately 2 to 5 microns.

27. A coated ceramic cutting tool according to claim 20 further comprising a second adherent coating layer bonded to said thin adherent coating layer.

28. A coated ceramic cutting tool according to claim 27 in which said second adherent coating layer is one or a combination selected from the group consisting of silicon carbide, silicon nitride, alumina, titanium diboride, titanium carbide, titanium carbonitride, zirconium oxide, zirconium carbide, boron carbide, boron nitride, hafnium carbide, hafnium nitride, tantalum carbide, niobium carbide, tungsten carbide, aluminum oxinitride and SIALONS.

29. A coated ceramic cutting tool according to claim 27 in which said second coating layer is applied by chemical vapor phase deposition, physical vapor deposition, a Sol-gel or ion implantation processes.

30. A coated ceramic cutting tool according to claim 27 in which said thin and said second coating layer thicknesses are each approximately 2 to 5 microns.

31. A coated composite comprising:
   a substrate comprising at least 2, and less than 60, volume percent silicon carbide whiskers;
   and less than about 98, and more than 40, volume percent alumina;
   and an alumina coating bonded to said substrate.

32. A coated composite comprising:
   a substrate comprising at least 2, and less than 40, volume percent silicon carbide whiskers;
   and less than about 98, and more than 60, volume percent alumina;
   and an alumina coating bonded to said substrate.

33. The coated composite according to claim 32 wherein said SiC whiskers comprise at least 2 to about 12 volume percent of said substrate.

34. The coated composite according to claim 32 wherein said SiC whiskers comprise about 20 to about 35 volume percent of said substrate.

35. The coated composite according to claim 32 wherein said SiC whiskers comprise about 20 volume percent of said substrate.

36. The coated composite according to claims 32, 33, 34 or 35 wherein said alumina coating has a thickness between about 1 to about 10 microns.

37. The coated composite according to claims 32, 33, 34 or 35 wherein said alumina coating has a thickness between about 2 to about 5 microns.

38. The coated composite according to claims 32, 33, 34 or 35 wherein said substrate further comprises a sintering aid.

39. The coated composite according to claims 32, 33, 34 or 35 wherein said substrate further comprises zirconia in an amount less than about 30 volume percent of said substrate.

40. A cutting insert comprising:

a cutting edge;

said cutting insert having a substrate and an alumina coating bonded to said substrate, said substrate composed of more than 2, and less than 40, volume percent silicon carbide whiskers, and less than 98, and more than 60, volume percent alumina.

41. The cutting insert according to claim 40 wherein said SiC whiskers comprise at least 2 to about 12 volume percent of said substrate.

42. The cutting insert according to claim 40 wherein said SiC whiskers comprise about 20 to about 35 volume percent of said substrate.

43. The cutting insert according to claim 40 wherein said SiC whiskers comprise about 20 volume percent of said substrate.

44. The cutting insert according to claims 40, 41, 42 or 43 wherein said alumina coating has a thickness between about 1 to about 10 microns.

45. The cutting insert according to claims 40, 41, 42 or 43 wherein said alumina coating has a thickness between about 2 to about 5 microns.

46. The cutting insert according to claims 40, 41, 42 or 43 wherein said substrate is further composed of a sintering aid.

47. The cutting insert according to claims 40, 41, 42 or 43 wherein said substrate is further composed of zirconia in an amount less than about 30 volume percent of said substrate.

48. The cutting insert according to claim 40, 41, 42 or 43 further comprising a TiN coating bonded over said alumina coating.

49. A cutting insert comprising:

a cutting edge;

said cutting insert having a substrate and an alumina coating bonded to said substrate;

and said substrate containing more than 2, and less than 40, volume percent SiC whiskers distributed in an alumina based matrix.

50. The cutting insert according to claim 49 wherein said substrate further comprises a sintering aid.

51. The cutting insert according to claim 49 wherein said substrate further contains zirconia in an amount less than about 30 volume percent of said substrate.

52. The cutting insert according to claims 49 or 51 wherein said substrate contains more than 2, and less than about 12, volume percent silicon carbide whiskers.

53. The cutting insert according to claims 49 or 51 wherein said substrate contains more than about 20, and less than about 35, volume percent silicon carbide whiskers.

54. The cutting insert according to claims 49 or 51 wherein said substrate contains about 20 volume percent silicon carbide whiskers.

55. A cutting insert comprising:

a cutting edge;

said cutting insert having a substrate and an alumina coating bonded to said substrate;

and said substrate composition consisting of more than 2, and less than 40, volume percent SiC whiskers distributed in said alumina matrix.

56. The cutting insert according to claim 55 wherein said substrate composition consists of more than 2, and less than about 12, volume percent SiC whiskers distributed in said alumina matrix.

57. The cutting insert according to claim 55 wherein said substrate composition consists of more than about 20, and less than about 35, volume percent Sic whiskers distributed in said alumina matrix.

58. The cutting insert according to claim 55 wherein said substrate composition consists of about 20 volume percent Sic whiskers distributed in said alumina matrix.

59. The cutting insert according to claims 55, 56, 57 or 58 wherein said substrate composition further consists of a sintering aid.

60. The cutting insert according to claims 55, 56, 57 or 58 wherein said substrate composition further consists of zirconia in an amount less than about 30 volume percent of said substrate.

\* \* \* \* \*

UNITED STATES PATENT AND TRADEMARK OFFICE
CERTIFICATE OF CORRECTION

PATENT NO.     : 6,447,896 B1                                       Page 1 of 1
DATED          : September 10, 2002
INVENTOR(S)    : Eugene M. Augustine It is certified that error appears in the above-identified patent and that said Letters Patent is hereby corrected as shown below:

<u>Title page,</u>
Item [57], ABSTRACT,
Line 8, delete "cuter" and substitute therefore -- outer --.

<u>Column 5,</u>
Line 1, remove the period after "40%"

Signed and Sealed this

Fourth Day of March, 2003

JAMES E. ROGAN
*Director of the United States Patent and Trademark Office*